US009624743B2

(12) United States Patent
Al Dabbous (10) Patent No.: US 9,624,743 B2
(45) Date of Patent: Apr. 18, 2017

(54) ELECTRODYNAMIC AND ELECTROMAGNETIC SUSPENSION SYSTEM TRACTOR

(71) Applicant: Saudi Arabian Oil Company, Dhahran (SA)

(72) Inventor: Mohammed Saeed Al Dabbous, Eastern Province (SA)

(73) Assignee: Saudi Arabian Oil Company, Dhaharan (SA)

( * ) Notice: Subject to any disclaimer, the term of this patent is extended or adjusted under 35 U.S.C. 154(b) by 498 days.

(21) Appl. No.: 14/297,934

(22) Filed: Jun. 6, 2014

(65) Prior Publication Data

US 2015/0354301 A1 Dec. 10, 2015

(51) Int. Cl.
| | | |
|---|---|---|
| *E21B 23/00* | (2006.01) |
| *E21B 23/08* | (2006.01) |
| *E21B 23/14* | (2006.01) |
| *E21B 47/022* | (2012.01) |
| *E21B 4/18* | (2006.01) |
| *F16L 55/30* | (2006.01) |

(52) U.S. Cl.
CPC ............... *E21B 23/00* (2013.01); *E21B 4/18* (2013.01); *E21B 23/08* (2013.01); *E21B 23/14* (2013.01); *E21B 47/02216* (2013.01); *E21B 2023/008* (2013.01); *F16L 55/30* (2013.01)

(58) Field of Classification Search
CPC .......... E21B 23/00; E21B 23/08; E21B 23/14; E21B 47/02216; E21B 4/18; E21B 2023/008; F16L 55/30
See application file for complete search history.

(56) References Cited

U.S. PATENT DOCUMENTS

| 3,597,022 A | 8/1971 | Waldron |
| 3,960,229 A | 6/1976 | Shio |
| 4,814,705 A | 3/1989 | Saunderson |

(Continued)

FOREIGN PATENT DOCUMENTS

| CN | 101979830 A | 2/2011 |
| GB | 2430020 A | 3/2007 |

OTHER PUBLICATIONS

PCT International Search Report and the Written Opinion of the International Searching Authority dated Oct. 14, 2015; International Application No. PCT/US2015/033896; International Filing Date: Jun. 3, 2015.

*Primary Examiner* — Blake Michener
(74) *Attorney, Agent, or Firm* — Bracewell LLP; Constance Gall Rhebergen (57) ABSTRACT

An apparatus for maneuvering a tool string within a borehole of a subterranean well includes a magnetic tractor casing with a central bore. A tractor body is located within the central bore of the magnetic tractor casing. A plurality of magnets are spaced along an outer surface of the tractor body, the plurality of magnets operable to generate a second magnetic field to interact with a first magnetic field of the magnetic tractor casing, to maintain an annular space between the tractor body and the magnetic tractor casing. A plurality of angled opening assemblies are spaced along the tractor body, each of the angled opening assemblies shaped to direct fluid away from the tractor body, to maintain an annular space between the magnetic tractor casing and the borehole of the subterranean well.

23 Claims, 3 Drawing Sheets

(56) References Cited

U.S. PATENT DOCUMENTS

| | | |
|---|---|---|
| 5,318,130 A | 6/1994 | Manke |
| 5,947,051 A | 9/1999 | Geiger |
| 5,947,213 A | 9/1999 | Angle et al. |
| 6,026,911 A | 2/2000 | Angle et al. |
| 6,220,346 B1 | 4/2001 | Gissler |
| 6,700,252 B2 | 3/2004 | Fleshman et al. |
| 7,377,326 B2 | 5/2008 | Shuster et al. |
| 7,378,769 B2 | 5/2008 | Head |
| 7,857,065 B2 | 12/2010 | Hansen |
| 8,302,682 B2 | 11/2012 | McInally |
| 2002/0079107 A1* | 6/2002 | Simpson ............... E21B 23/00 166/383 |
| 2007/0029445 A1 | 2/2007 | Avello |
| 2007/0199715 A1* | 8/2007 | Ayoub ................... E21B 43/01 166/336 |
| 2013/0068479 A1 | 3/2013 | AlDossary |
| 2013/0248174 A1 | 9/2013 | Dale et al. |
| 2014/0014321 A1 | 1/2014 | McNay |

* cited by examiner

ELECTRODYNAMIC AND ELECTROMAGNETIC SUSPENSION SYSTEM TRACTOR

BACKGROUND OF THE INVENTION

1. Field of the Invention

The present invention relates to operations in a wellbore associated with the production of hydrocarbons. More specifically, the invention relates to a tool for use in wireline operations in deviated and horizontal wellbores.

2. Description of the Related Art

Wireline tools are used in the hydrocarbon industry for well intervention, reservoir characterization, and pipe recovery. Wireline tools can provide well information and perform well services such as depth correlation, wellbore flow characterization, cement integrity evaluations, wellbore diagnostic operations, and remedial operations. Wireline logs constantly retrieve measurements downhole via electrical wireline. Wireline logs can measure resistivity, conductivity, porosity, wave transmit time and so forth. These critical parameters are of paramount importance for geologists; drilling, reservoir, and production engineers from which vital decisions are made during various phases of exploration and development. Furthermore, wireline logs are used frequently in workover operations where wells need remedial work in order to flow efficiently. Wireline includes electrical conductors within the core of the outside minor wires in order to transmit signals, such as for power and data, between the tool and the surface. Wireline and slickline are both used for workover and logging purposes. Slickline is instead a thin cable used to introduce and retrieve equipment downhole.

Often in the recovery of hydrocarbons from subterranean formations, wellbores are drilled with highly deviated or horizontal portions that can extend through one or a number of separate hydrocarbon-bearing production zones. Tractors are used to force tool string, such as wireline and slickline, into the hole in highly deviated and horizontal wells where gravity does not play any crucial role. Conventional tractors use wheels to push against the side of the wellbore, which increases the force required to push the wireline tools. The use of tractors with wheels increases the gross size of the tool, which is a significant parameter in determining the appropriate type of tractors that could be used for diverse sized holes. Alternately, coiled tubing or drillpipe may be used to push tools through the wellbore. However, the use of coiled tubing or drillpipe increases the number of trips in the wellbore, making it higher cost and lower efficiency, compared to the use of tractors. The use of wireline technology continues to increase the opportunities for development and implementing interventions which are an imperative means of improving oil and gas production.

SUMMARY OF THE INVENTION

The systems and methods of this disclosure will provide a tool to push tool string, such as wireline and slickline, into the wellbore in highly deviated and horizontal wells where gravity does not play any crucial role without the use of drillpipe, coiled tubing, or tractor tires. By applying an electrodynamic or electromagnetic suspension system, tractors of methods and systems described herein function without wheels. The wellbore fluids are utilized to move the tool forward and backward. The systems and methods of this disclosure are more efficient in accelerating and decelerating than tractors that use wheels since no forces are required to overcome friction. More importantly, the tractors disclosed herein are smaller than conventional wheeled tractors, minimizing problems associated with wheels being stuck within wellbores.

In embodiments of the current disclosure, an apparatus for maneuvering a tool string within a borehole of a subterranean well includes a magnetic tractor casing. The magnetic tractor casing is a cylindrical tubular member with a central bore, a first end and a second end opposite the first end. A tractor body is located within the central bore of the magnetic tractor casing, the tractor body being an elongated member. A plurality of magnets are spaced along an outer surface of the tractor body. The plurality of magnets are operable to generate a second magnetic field to interact with a first magnetic field of the magnetic tractor casing, to maintain an annular space between the tractor body and the magnetic tractor casing. A plurality of angled opening assemblies are spaced along the tractor body, each of the angled opening assemblies shaped to direct fluid away from the tractor body, to maintain an annular space between the magnetic tractor casing and the borehole of the subterranean well.

In alternate embodiments, a venturi opening can be located at the first end of the magnetic tractor casing. A plurality of fluid lines can each have an entrance end proximate to the first end of the magnetic tractor casing and an exit end in fluid communication with one of the angled opening assemblies. Each of the angled opening assemblies can include tubular segments arranged in a diamond shaped pattern, each of the tubular segments having adjustable openings extending through a sidewall of the tubular segments. An openings control system can be in communication with the adjustable openings. Outer openings can be spaced along the magnetic tractor casing. Each of the outer openings can be shaped to direct a fluid away from the magnetic tractor casing, to maintain an annular space between the magnetic tractor casing and the borehole of the subterranean well.

In other alternate embodiments, the magnets can be electromagnets, the electromagnets being in communication with the tool string. A cable head can be selectively connected to the tool string, the cable head being located proximate to the first end of the magnetic tractor casing. A plurality of guide fences can be spaced on an outer surface of the magnetic tractor casing, the guide fences sized to centralize the magnetic tractor casing within the borehole of the subterranean well.

In yet other alternate embodiments, a forward opening can be located on each of the angled opening assemblies. The forward opening can be shaped to direct fluid away from the tractor body to move the apparatus in a direction further into the subterranean well. A reverse opening can be located on each of the angled opening assemblies. The reverse opening can be shaped to direct fluid away from the tractor body to move the apparatus in a direction out of the subterranean well.

In still other alternate embodiments, a screen with a screen mesh sized to prevent the accumulation of particulates can extend across the central bore proximate to the first end of the magnetic tractor casing. The tractor body can have a leading end coupled to the magnetic tractor casing proximate to the second end of the magnetic tractor casing. The tractor body can have a following end located within the magnetic tractor casing proximate to the first end of the magnetic tractor casing. The apparatus can also include a cable head selectively connected to the tool string, the cable head being located at the following end of the tractor body.

In other embodiments of the current disclosure, an apparatus for maneuvering a tool string within a borehole of a subterranean well includes a magnetic tractor casing. The magnetic tractor casing is a cylindrical tubular member with a central bore, a first end with a venturi opening and a second end opposite the first end. The central bore is open at the first end and the second end. A tractor body is located within the central bore of the magnetic tractor casing, the tractor body being an elongated member. A plurality of electromagnets are spaced along an outer surface of the tractor body, the plurality of electromagnets generating a second magnetic field operable to interact with a first magnetic field of the magnetic tractor casing to maintain an annular space between the tractor body and the magnetic tractor casing. A plurality of angled opening are spaced along the tractor body. A plurality of fluid lines provide a fluid flow path from an entrance end of the fluid line proximate to the first end of the magnetic tractor casing to an exit end at the angled opening assemblies. The fluid lines selectively direct fluids from within the central bore to outside the tractor body, to maintain an annular space between the magnetic tractor casing and the borehole.

In alternate embodiments, each of the angled opening assemblies can include tubular segments arranged in a diamond shaped pattern. Each of the tubular segments can have adjustable openings extending through a sidewall of the tubular segments. An openings control system can be in communication with the adjustable openings. Outer openings can be spaced along the magnetic tractor casing, each of the outer openings selectively directing fluids from within the central bore to outside the magnetic tractor casing, to maintain an annular space between the magnetic tractor casing and the borehole. A plurality of guide fences can be spaced on an outer surface of the magnetic tractor casing, the guide fences sized to centralize the magnetic tractor casing within the borehole of the subterranean well.

In other alternate embodiments, a forward opening can be located on each of the angled opening assemblies. The forward opening can be shaped to direct fluid away from the tractor body to move the apparatus in a direction further into the subterranean well. A reverse opening can be located on each of the angled opening assemblies. The reverse opening can be shaped to direct fluid away from the tractor body to move the apparatus in a direction out of the subterranean well. An openings control system can be in communication with the forward openings and the reverse openings.

In yet other alternate embodiments, the tractor body can have a leading end coupled to the magnetic tractor casing proximate to the second end of the magnetic tractor casing. The tractor body can have a following end located within the magnetic tractor casing proximate to the first end of the magnetic tractor casing. A cable head can be selectively connected to the tool string, the cable head being located at the following end of the tractor body.

In other embodiments of the current disclosure, a method for maneuvering a tool string within a borehole of a subterranean well includes providing a tractor assembly. The tractor assembly includes a magnetic tractor casing with a central bore, a tractor body located within the central, a plurality of magnets spaced along an outer surface of the tractor body, and a plurality of angled opening assemblies spaced along the tractor body. The tool string is attached to a cable head of the tractor assembly. The tractor assembly and tool string is lowered into the subterranean well. The magnets are operated to generate a second magnetic field to interact with a first magnetic field of the magnetic tractor casing to maintain an annular space between the tractor body and the magnetic tractor casing. Fluids are directed through the angled opening assemblies and away from the tractor body, to maintain an annular space between the magnetic tractor casing and the borehole. Fluids are pumped into the borehole to move the tractor assembly forwards and backwards within the borehole.

In alternate embodiments, the tractor assembly can include a plurality of fluid lines. Each of the fluid lines can provide a fluid flow path from an entrance end of the fluid line proximate to the first end of the magnetic tractor casing to an exit end at the angled opening assemblies. The step of directing fluids through the angled opening assemblies includes directing fluids through the fluid lines. The magnetic tractor casing can have outer openings spaced along the magnetic tractor casing. Fluids from within the central bore can be directed to outside the magnetic tractor casing through the outer openings to maintain an annular space between the magnetic tractor casing and the borehole.

In other alternate embodiments, the tractor assembly can move forwards and backwards within the borehole by directing fluids through the angled opening assemblies and away from the tractor body. Each of the angled opening assemblies can include tubular segments arranged in a diamond shaped pattern. Each of the tubular segments can have adjustable openings extending through a sidewall of the tubular segments and the method can further include adjusting the size of the adjustable openings with a control system to control the flow of fluids through the adjustable openings.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE
EXEMPLARY EMBODIMENTS

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternate embodiments or positions.

In the following discussion, numerous specific details are set forth to provide a thorough understanding of the present invention. However, it will be obvious to those skilled in the art that the present invention can be practiced without such specific details. Additionally, for the most part, details concerning well drilling, reservoir testing, well completion and the like have been omitted inasmuch as such details are not considered necessary to obtain a complete understanding of the present invention, and are considered to be within the skills of persons skilled in the relevant art.

Figure 1:
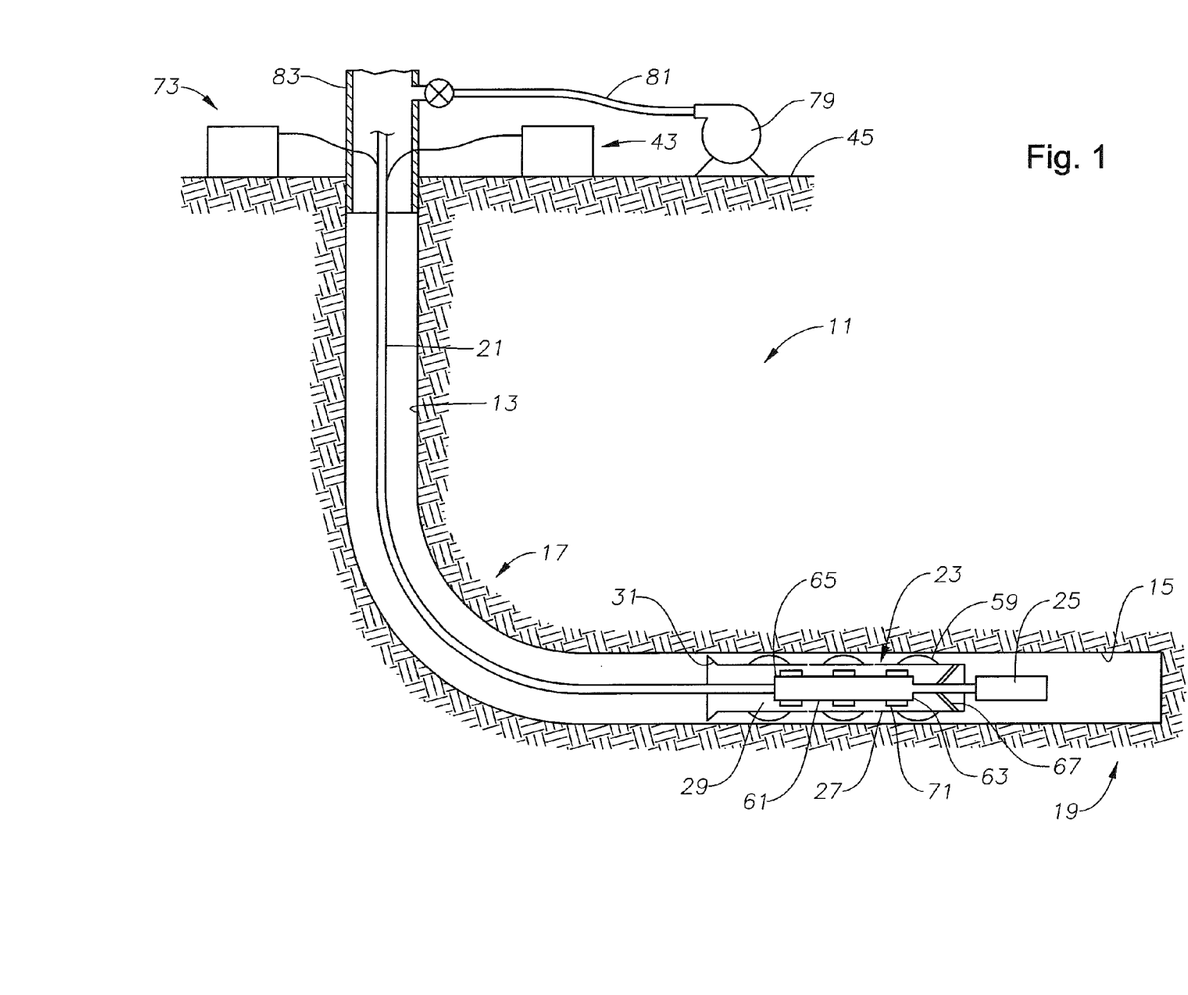
FIG. 1 is a schematic representation of a portion of a subterranean well with a tractor assembly in accordance with an embodiment of the present disclosure

Referring to FIG. 1, a well system 11 includes a subterranean well with a borehole 13. In the illustrated embodiment, borehole 13 includes a lateral bore 15 having a heel 17 and a toe 19. A tool string 21 extends into the borehole 13. Tool string 21 can be, for example wireline or slickline, and in a preferred embodiment is a wireline. Tool string 21 has a tractor assembly 23 connected to its lower end. Tractor assembly 23 is used to maneuver the tool string 21 within a borehole 13 of the subterranean well. Downhole tool 25 can be associated with the tractor assembly 23. In the illustrated embodiment of FIG. 1, downhole tool 25 is attached to a side of tractor assembly 23 opposite tool string 21. In alternate embodiments, downhole tool 25 can be attached between tractor assembly 23 and tool string 21 or can be located along tool string 21 a distance apart from tractor assembly 23.

Figure 2:
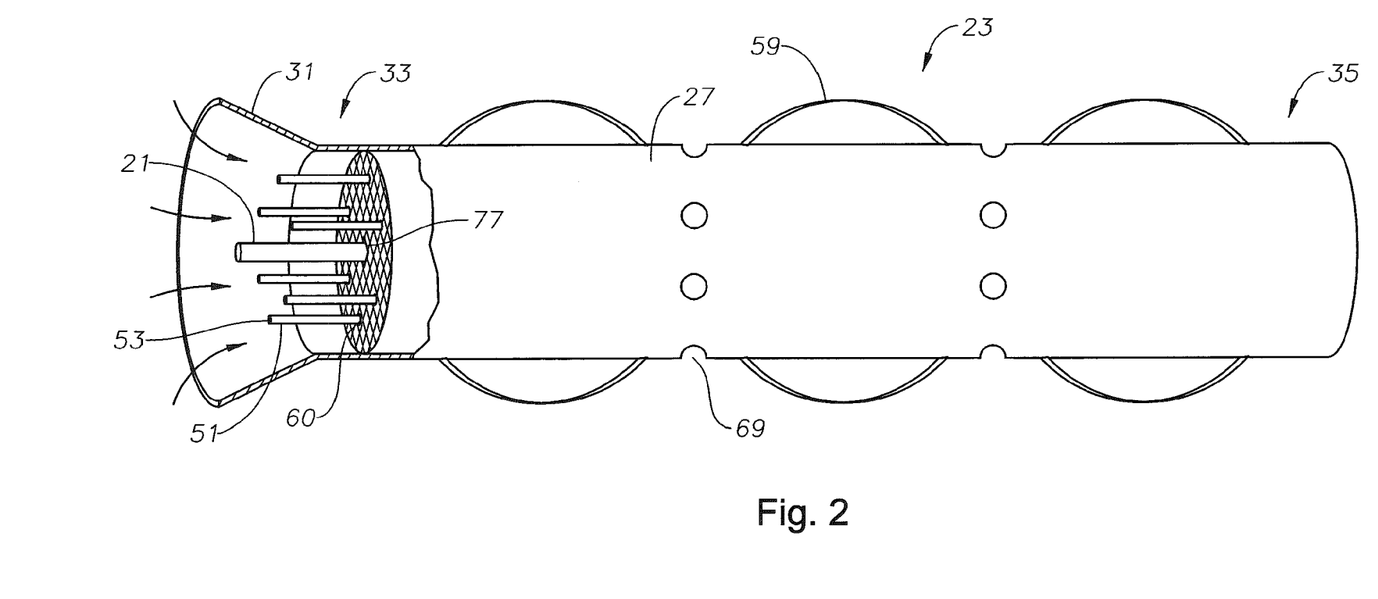
FIG. 2 is a perspective view with a partial section view of the tractor assembly of FIG. 1.
Figure 3:
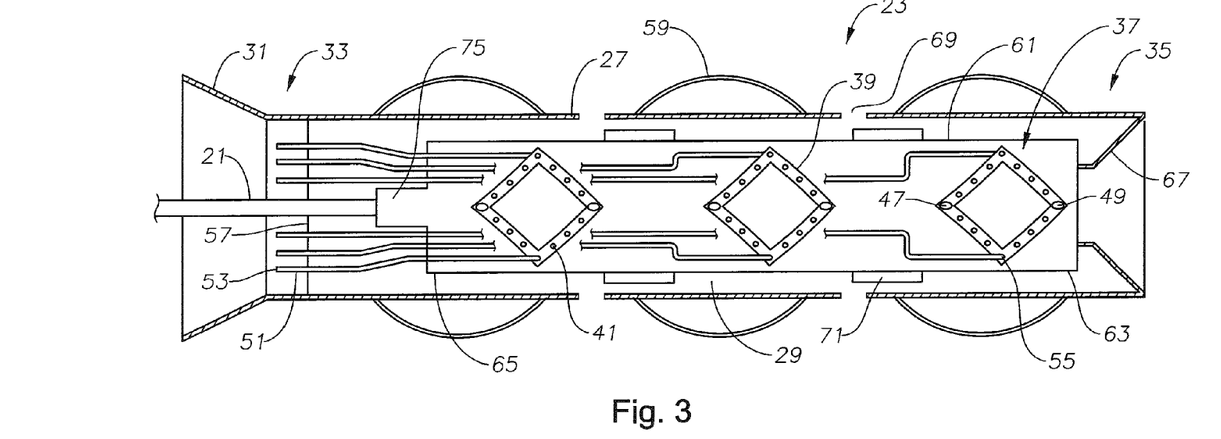
FIG. 3 is a section view of the tractor assembly of FIG. 1.

Looking now at FIGS. 1-3, tractor assembly 23 includes magnetic tractor casing 27. Magnetic tractor casing 27 is a cylindrical tubular member with a central bore 29. Magnetic tractor casing 27 can be formed of a ferromagnetic material, and can be, as an example, iron, nickel, cobalt, or a rare earth metal. Magnetic tractor casing 27 can be magnetized to form a permanent magnet that generates its own first magnetic field.

Venturi opening 31 is located at first end 33 of magnetic tractor casing 27. Venturi opening 31 has a frusto-conical sidewall with an inner diameter adjacent to the cylindrical portion of magnetic tractor casing 27 that equals the inner diameter of the cylindrical portion of magnetic tractor casing 27. The inner diameter of venturi opening 31 enlarges away from the cylindrical portion of magnetic tractor casing 27. Therefore, as fluid enters magnetic tractor casing 27 through venturi opening 31, the speed of the fluid will increase and the pressure of the fluid will decrease as the inner diameter, and therefore the cross sectional area, of the magnetic tractor casing 27 through which the fluid flows, decreases. Magnetic tractor casing 27 has second end 35 opposite first end 33. Central bore 29 is open at first end 33 and at second end 35.

Magnetic tractor casing 27 can have a plurality of guide fences 59 spaced on an outer surface of magnetic tractor casing 27. Guide fences 59 can be curved members, each guide fence 59 having two ends that are attached to the outer surface of magnetic tractor casing 27 and a middle portion that protrudes outward from the outer surface of magnetic tractor casing 27. Guide fences 59 sized and spaced to centralize magnetic tractor casing 27 within borehole 13 of the subterranean well.

Tractor assembly 23 includes tractor body 61 that is located within central bore 29 of magnetic tractor casing 27. Tractor body 61 is an elongated member with leading end 63 and following end 65 opposite leading end 63. Leading end 63 can be coupled to magnetic tractor casing 27 proximate to second end 35 of magnetic tractor casing 27. As an alternate example, leading end 63 can be coupled to magnetic tractor casing 27 with leading structural members 67. Following end 65 can have no direct structural connection to magnetic tractor casing 27 and can be free to move within magnetic tractor casing 27, in order to avoid creating excessive tension at a junction of tool string 21, following end 65, and magnetic tractor casing 27. Following end 65 can alternately be coupled to magnetic tractor casing 27 proximate to first end 33 of magnetic tractor casing 27 with following structural members that are similar to those described for leading structural members 67.

Leading structural members 67 can be solid frusto-conical shaped members that prevent fluid from passing by leading structural members 67 and through magnetic tractor casing 27, other than by way of fluid lines 51 which pass through leading structural members 67. Alternately, leading structural members 67 can be struts that do not extend entirely across central bore 29, but instead are spaced to allow for fluids to enter venturi opening 31 at first end 33, flow through central bore 29, and exit at second end 35 of magnetic tractor casing 27, or for fluid to flow into second end 35, through central bore 29, and exit through venturi opening 31 at first end 33.

Tractor body 61 has a plurality of angled opening assemblies 37 spaced along the length and circumference of tractor body 61. In addition, in certain embodiments, a plurality of outer openings 69 are spaced along magnetic tractor casing 27, extending through a sidewall of magnetic tractor casing 27. Each of the outer openings 69 is shaped to direct fluid away from magnetic tractor casing 27, to maintain an annular space between magnetic tractor casing 27 and borehole 13. Outer openings 69 selectively direct fluids from within central bore 29 to outside magnetic tractor casing 27. Angled opening assemblies 37 are shaped to direct fluid away from tractor body 61 and out of outer openings 69. Fluid exiting out of outer openings 69 act interact with fluids inside borehole 13 and with an inner diameter of borehole 13, applying sufficient force to move magnetic tractor casing 27 within borehole 13. In this way, the location of magnetic tractor casing 27 can be controlled to maintain an annular space between the magnetic tractor casing the borehole of the subterranean well so that magnetic tractor casing 27 floats or levitates within borehole 13.

In alternate embodiments, there are no outer openings 69 and instead the fluids exiting through angled opening assemblies 37 interact with fluids inside central bore 29 of tractor casing 27 and with an inner diameter of central bore 29, applying sufficient force to move magnetic tractor casing 27 within borehole 13 and maintain an annular space between the magnetic tractor casing the borehole of the subterranean well so that magnetic tractor casing 27 floats or levitates within borehole 13.

The number of angled opening assemblies 37 will be dependent on the size of magnetic tractor casing 27. As an example, if magnetic tractor casing 27 is twenty feet long, angled opening assemblies 37 might be spaced four feet apart axially, and spaced 180 degrees radially, for a total of ten angled opening assemblies 37. In the example of FIG. 3, three of six total angled opening assemblies 37 are shown. Alternately, more or fewer angled opening assemblies 37 may be used, as needed or desired.

Figure 4:
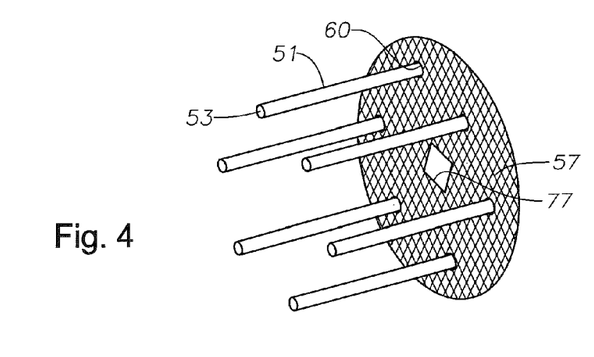
FIG. 4 is a perspective view of a portion of the tractor assembly of FIG. 1.

Each angled opening assembly 37 includes tubular segments 39 arranged in a rhombus or diamond shaped pattern. Each of the tubular segments 39 has adjustable openings 41 extending through a sidewall of the tubular segments 39. Each tubular segment 39 of each angled opening assembly 37 is in fluid communication with each other tubular segment 39 of such angled opening assembly 37. Tubular segments 39 can be defined by tubular bores drilled within the magnetic tractor casing 27 or can be separate tubular members attached to a sidewall of magnetic tractor casing 27.

Openings control system 43 is in communication with adjustable openings 41 of each angled opening assembly 37 and can also be in communication with outer openings 69, in embodiments with outer openings 69. Openings control system 43 can be located at a surface 45 location proximate to borehole 13 of the subterranean well and use a wired communication system. Alternately, openings control system 43 can be located at a surface 45 location remote from borehole 13 of the subterranean well and use a wired or wireless communication system. Openings control system 43 can utilize communications wires that are part of tool string 21 to transfer control signals to outer openings 69 and adjustable openings 41 of each angled opening assembly 37. Openings control system 43 can signal each outer opening 69 to open or close adjustable outer openings 69 or to vary the size of outer openings 69 in a position between an open or closed position. Openings control system 43 can also signal each angled opening assembly 37 to open or close adjustable openings 41 or to vary the size of adjustable openings 41 in a position between an open or closed position. Openings control system 43 can signal each outer opening 69 and angled opening assembly 37 such that each adjustable outer opening 69 and opening 41 can be individually and separately controlled. In alternate embodiments, openings 69 are not controllable but are instead static orifices through the sidewall of magnetic tractor casing 27.

Openings control system 43 can include a feedback loop for transmitting information relating to the position of magnetic tractor casing 27 within borehole 13 so that adjustable outer openings 69 and openings 41 can be appropriately adjusted. In this way, openings control system 43 can control the volume, velocity, and pressure of fluids exiting through outer opening 69 and each adjustable opening 41 of angled opening assemblies 37 in order to maintain the annular space between magnetic tractor casing 27 and borehole 13 so that magnetic tractor casing 27 can float or levitate within borehole 13 in varying borehole 13 conditions.

In addition to adjustable openings 41, angled opening assemblies 37 also include forward opening 49. Forward opening 49 is shaped to direct fluid away from tractor body 61 to move tractor assembly 23 forward, in a direction further into borehole 13 of the subterranean well. In the illustrated embodiment of FIG. 3, forward opening 49 is shown at the vertex of each angled opening assembly 37 that is closest to second end 35 of magnetic tractor casing 27. In alternate embodiments, forward opening 49 can be located at any location along tubular segment 39. Forward opening 49 is shaped to direct fluid away from tractor body 61 and towards second end 35 of magnetic tractor casing 27 so that the resulting force of such exiting fluid on the wellbore fluids located within borehole 13 moves tractor assembly 23 further into borehole 13 of the subterranean well.

Looking again at FIG. 3, reverse opening 47 is located on angled opening assembly 37. Reverse opening 47 is shaped to direct fluid away from tractor body 61 to move tractor assembly 23 in a reverse direction, such as a direction out of borehole 13 of the subterranean well. In the illustrated embodiments of FIG. 3, reverse opening 47 is shown at the vertex of each angled opening assembly 37 that is closest to first end 33 of magnetic tractor casing 27. In alternate embodiments, reverse opening 47 can be located at any location along tubular segment 39. Reverse opening 47 is shaped to direct fluids away from tractor body 61 towards first end 33 of magnetic tractor casing 27 so that the resulting force of such exiting fluid on the wellbore fluids located within borehole 13 moves tractor assembly 23 in a direction out of borehole 13 of the subterranean well.

Openings control system 43 is also in communication with forward opening 49 and reverse opening 47. Openings control system 43 can signal each angled opening assembly 37 to open or close each forward opening 49 and reverse opening 47 individually or to vary the size of each forward opening 49 and reverse opening 47 in a position between an open or closed position individually. Openings control system 43 can include a feedback loop for transmitting information relating to the position of magnetic tractor casing 27 within borehole 13 so that forward opening 49 and reverse opening 47 can be appropriately adjusted. In this way, openings control system 43 can control the volume, velocity, and pressure of fluids exiting through forward opening 49 and reverse opening 47 in order to move tractor assembly 23 in a direction further into or out of borehole 13 of the subterranean well. As will be further described below, the use of forward opening 49 and reverse opening 47 to move tractor assembly 23 in a direction further into or out of borehole 13 of the subterranean well can be considered a back-up system, for use should pumped fluids acting on surfaces of tractor assembly 23 be insufficient to move tractor assembly 23 in a direction further into or out of borehole 13.

Tractor assembly 23 includes a plurality of fluid lines 51. Each fluid line 51 has entrance end 53 located proximate to first end 33 of magnetic tractor casing 27 and exit end 55 in fluid communication with one of the angled opening assemblies 37. Fluid lines 51 can be formed of metal and extend into tractor body 61. A portion of fluid lines 51 can be embedded within tractor body 61. A portion of fluid lines 51 can be formed separate from tractor body 61, or can be defined in part by bores drilled within tractor body 61.

Screen 57 extends across central bore 29 proximate to first end 33 of magnetic tractor casing 27. Screen 57 has a screen mesh sized to prevent the accumulation of particulates. Fluid lines 51 pass through openings 60 of screen 57 so that entrance end 53 is located on an outer side of screen 57 and exit end 55 is located at an opposite inner side of screen 57.

Fluid lines 51 provide a fluid flow path from entrance end 53 to an exit end 55 at angled opening assemblies 37, selectively directing fluids that are within central bore 29 proximate to first end 33 of magnetic tractor casing 27, to outside tractor body 61 by way of angled opening assemblies 37. As described above, such fluid direction can maintain an annular space between magnetic tractor casing 27 and borehole 13 and can move tractor assembly 23 in a direction further into or out of borehole 13. The number of fluid lines 51 can be equal to the number of angled opening assemblies 37. In the example of FIGS. 2-3, six fluid lines 51 are shown. One of the fluid lines 51 are fluidly connected to one the three angled opening assemblies 37, and the remaining three fluid lines 51 are fluidly connected to three other angled opening assemblies 37 (not shown) which are located on an opposite side of tractor body 61 at the same axial distances along tractor body 61 as the three illustrated angled opening assemblies 37. Fluid lines 51 provide for equal distribution of fluid flow at each of the angled opening assemblies 37. In alternate embodiments, tractor assembly 23 does not have fluid lines 51 and fluid instead passes from within tractor body 61 to the outside of tractor body 61 through adjustable openings 41 only.

A plurality of magnets 71 are spaced along an outer surface of tractor body 61. Magnets 71 generate a second magnetic field that interacts with the first magnetic field that is generated by magnetic tractor casing 27, to maintain an annular space between tractor body 61 and magnetic tractor casing 27. Magnets 71 and magnetic tractor casing 27 can be magnetized so that magnets 71 and magnetic tractor casing 27 repel each other, causing tractor body 61 to be urged away from magnetic tractor casing 27. By balancing the magnetic repulsion forces around the circumference of tractor body 61 and magnetic tractor casing 27, an annular space can be maintained between tractor body 61 and magnetic tractor casing 27. Alternately, magnets 71 and magnetic tractor casing 27 can be magnetized so that magnets 71 and magnetic tractor casing 27 attract each other, causing tractor body 61 to be urged towards from magnetic tractor casing 27. By balancing the magnetic attraction forces around the circumference of tractor body 61 and magnetic tractor casing 27, an annular space can be maintained between tractor body 61 and magnetic tractor casing 27.

Magnets 71 can be electromagnets that are in communication with tool string 21 and can be powered and controlled by signals transmitted along tool string 21. In an example embodiment, an electromagnet control system 73 can be located at a surface 45 location proximate to borehole 13 of the subterranean well and use a wired communication system. Alternately, electromagnet control system 73 can be located at a surface 45 location remote from borehole 13 of the subterranean well and use a wired or wireless communication system. Electromagnet control system 73 can utilize communications wires that are part of tool string 21 to transfer control signals to magnets 71. Electromagnet control system 73 can acquire feedback as to the position of tractor body 61 within magnetic tractor casing 27 and provide a signal to magnets 71 to alter the strength of the second magnetic field to stabilize tractor body 61 within magnetic tractor casing 27 so that tractor body 61 floats or levitates within magnetic tractor casing 27.

Tractor assembly 23 further includes cable head 75. Cable head 75 can be selectively connected to tool string 21. Cable head 75 is located proximate to first end 33 of magnetic tractor casing 27 and can be located at following end 65 of tractor body 61. Cable head 75 can be located axially within magnetic tractor casing 27 so that tool string 21 passes from an inner side of screen 57 to an outer side of screen 57 by way of screen central opening 77 through screen 57.

In an example of operation, to maneuver tool string 21 within borehole 13 of the subterranean well, an operator can first attach tool string 21 to cable head 75 of tractor assembly 23. Downhole tool 25 can be connected to tractor assembly 23 or to tool string 21. Tractor assembly 23 with tool string 21 and downhole tool 25 can then be lowered into borehole 13 of the subterranean well. When borehole 13 is vertical or near vertical, the force of gravity can be sufficient to pull tractor assembly 23 further into borehole 13.

As tractor assembly 23 moves through borehole 13, guide fences 59 assist in centralizing magnetic tractor casing 7 within borehole 13. In order to maintain the annular space between magnetic tractor casing 27 and borehole 13, fluids can be directed through angled opening assemblies 37 and out through outer openings 69 to interact with fluids inside borehole 13 and with an inner diameter of borehole 13, applying sufficient force to move and maintain magnetic tractor casing 27 within borehole 13. Alternately, fluids can be directed through angled opening assemblies 37 to interact with fluids inside central bore 29 of tractor casing 27 and with an inner diameter of central bore 29, applying sufficient force to the fluids inside central bore 29 of tractor casing 27 to move and maintain the position of magnetic tractor casing 27 within borehole 13.

Pump 79 can be used to pump fluids though tubing 81, to wellhead 83 and into borehole 13. Tubing 81 can be fluidly connected to a production tubing or other tubular member (not shown) located within wellhead 83 to pump fluid through such production tubular to reach tractor assembly 23. Fluids flow into entrance end 53 of fluid lines 51 and out exit end 55 of fluid lines 51 to angled opening assemblies 37. Pump 79 can be, for example, triplex or quintuplex pumps located at surface 45. The fluids pumped by pump 79 can be production fluids that were extracted from the subterranean well, refined by removing certain gases and other impurities and diverted to pump 79.

Openings control system 43 can signal each angled opening assembly 37 to control the volume, velocity, and pressure of the fluids exiting through angled opening assemblies 37 and outer openings 69 in order to maintain the annular space between magnetic tractor casing 27 and borehole 13 so that magnetic tractor casing 27 can float or levitate within borehole 13 in varying borehole 13 conditions.

As tractor assembly 23 continues through borehole 13, magnets 71 can be controlled by electromagnet control system 73. Electromagnetic control system 73 can provide a signal to magnets 71 to alter the strength of the second magnetic field to stabilize tractor body 61 within magnetic tractor casing 27 to maintain an annular space between tractor body 61 and magnetic tractor casing 27 so that tractor body 61 floats or levitates within magnetic tractor casing 27.

As tractor assembly 23 reaches a point within borehole 13 where gravity alone is no longer able to pull tractor assembly 23 father within borehole 13, fluids can be utilized to maneuver tool string 21 within borehole 13. In order to move tractor assembly 23 forwards and backwards within borehole 13, and in particular, within lateral bore 15, pump 79 can be used to pump fluids though tubing 81, to wellhead 83 and into borehole 13. The fluids can act on tractor assembly 23 to move tractor assembly 23 forwards and backwards within borehole 13. For example, as pump 79 pumps fluids into borehole 13, such fluids will apply forces to the surfaces of tractor assembly 23 in a direction parallel to the direction of travel of the fluids so that tractor assembly 23 will travel farther into borehole 13.

If the fluid forces acting on the surfaces of tractor assembly 23 are not sufficient to maneuver tool string 21 within borehole 13, as a backup system, openings control system 43 can communicate with forward opening 49 and reverse opening 47. Forward opening 49 and reverse opening 47 can be controlled to direct fluid away from tractor body 61 to move tractor assembly 23 further into or in a direction out of borehole 13.

In this manner, downhole tool 25 can be positioned within borehole 13 to perform a desired function. When tractor assembly 23 is ready to be moved in a direction out of borehole 13 to remove tractor assembly 23 from borehole 13, tool string 21 can be used to pull downhole tool 25 out of borehole 13. As tractor assembly 23 is pulled out of borehole 13, fluids will spontaneously pass through the fluid lines 51 to the angled opening assemblies 37 and fluids will be directed through the reverse openings 47, which will assist the tractor assembly 23 in moving out of borehole 13. As a backup system, openings control system 43 can communicate with reverse opening 47 to direct fluid away from tractor body 61 to move tractor assembly 23 in a direction out of borehole 13.

As discussed herein, embodiments of the current disclosure therefore do not require wheels to maneuver tool string 21 within borehole 13. This allows tractor assembly 23 to be utilized in smaller boreholes, in boreholes with steeper or more corners or doglegs, and in boreholes with more other irregular shapes and restrictions, compared to tractor assemblies that utilize wheels. Without wheels, tractor assembly 23 does not rely on traction and friction to accelerate and decelerate, making these operations more efficient and energy saving.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An apparatus for maneuvering a tool string within a borehole of a subterranean well, the apparatus comprising:
   a magnetic tractor casing, the magnetic tractor casing being a cylindrical tubular member with a central bore, a first end and a second end opposite the first end;
   a tractor body located within the central bore of the magnetic tractor casing, the tractor body being an elongated member;
   a plurality of magnets spaced along an outer surface of the tractor body, the plurality of magnets operable to generate a second magnetic field to interact with a first magnetic field of the magnetic tractor casing, to maintain an annular space between the tractor body and the magnetic tractor casing; and
   a plurality of angled opening assemblies spaced along the tractor body, each of the angled opening assemblies shaped to direct a fluid away from the tractor body, to maintain an annular space between the magnetic tractor casing and the borehole of the subterranean well.

2. The apparatus of claim 1, further comprising a venturi opening at the first end of the magnetic tractor casing.

3. The apparatus of claim 1, further comprising a plurality of fluid lines, each of the fluid lines having an entrance end proximate to the first end of the magnetic tractor casing and an exit end in fluid communication with one of the angled opening assemblies.

4. The apparatus of claim 1, wherein each of the angled opening assemblies include tubular segments arranged in a diamond shaped pattern, each of the tubular segments having adjustable openings extending through a sidewall of the tubular segments.

5. The apparatus of claim 4, further comprising an openings control system in communication with the adjustable openings.

6. The apparatus of claim 1, wherein the magnets comprise electromagnets, the electromagnets being in communication with the tool string.

7. The apparatus of claim 1, further comprising a cable head selectively connected to the tool string, the cable head being located proximate to the first end of the magnetic tractor casing.

8. The apparatus of claim 1, further comprising a plurality of guide fences spaced on an outer surface of the magnetic tractor casing, the guide fences sized to centralize the magnetic tractor casing within the borehole of the subterranean well.

9. The apparatus of claim 1, further comprising:
   a forward opening located on each of the angled opening assemblies, the forward opening shaped to direct the fluid away from the tractor body to move the apparatus in a direction further into the subterranean well; and
   a reverse opening located on each of the angled opening assemblies, the reverse opening shaped to direct the fluid away from the tractor body to move the apparatus in a direction out of the subterranean well.

10. The apparatus of claim 1, further comprising a screen with a screen mesh sized to prevent an accumulation of particulates, the screen extending across the central bore proximate to the first end of the magnetic tractor casing.

11. The apparatus of claim 1, wherein:
   the tractor body has a leading end coupled to the magnetic tractor casing proximate to the second end of the magnetic tractor casing;
   the tractor body has a following end located within the magnetic tractor casing proximate to the first end of the magnetic tractor casing; and
   the apparatus further comprises a cable head selectively connected to the tool string, the cable head being located at the following end of the tractor body.

12. The apparatus of claim 1, further comprising outer openings spaced along the magnetic tractor casing, each of the outer openings shaped to direct a fluid away from the magnetic tractor casing, to maintain an annular space between the magnetic tractor casing and the borehole of the subterranean well.

13. An apparatus for maneuvering a tool string within a borehole of a subterranean well, the apparatus comprising:
   a magnetic tractor casing, the magnetic tractor casing being a cylindrical tubular member with a central bore, a first end with a venturi opening and a second end opposite the first end, the central bore being open at the first end and the second end;
   a tractor body located within the central bore of the magnetic tractor casing, the tractor body being an elongated member;
   a plurality of electromagnets spaced along an outer surface of the tractor body, the plurality of electromagnets generating a second magnetic field operable to interact with a first magnetic field of the magnetic tractor casing to maintain an annular space between the tractor body and the magnetic tractor casing;
   a plurality of angled opening assemblies spaced along the tractor body; and
   a plurality of fluid lines, each of the fluid lines providing a fluid flow path from an entrance end of the fluid line proximate to the first end of the magnetic tractor casing to an exit end at the angled opening assemblies, selectively directing fluids from within the central bore to outside the tractor body, to maintain an annular space between the magnetic tractor casing and the borehole.

14. The apparatus of claim 13, wherein each of the angled opening assemblies include tubular segments arranged in a diamond shaped pattern, each of the tubular segments having adjustable openings extending through a sidewall of the tubular segments, the apparatus further comprising an openings control system in communication with the adjustable openings.

15. The apparatus of claim 13, further comprising a plurality of guide fences spaced on an outer surface of the magnetic tractor casing, the guide fences sized to centralize the magnetic tractor casing within the borehole of the subterranean well.

16. The apparatus of claim 13, further comprising:
   a forward opening located on each of the angled opening assemblies, the forward opening shaped to direct fluid away from the tractor body to move the apparatus in a direction further into the subterranean well;

a reverse opening located on each of the angled opening assemblies, the reverse opening shaped to direct fluid away from the tractor body to move the apparatus in a direction out of the subterranean well; and an openings control system in communication with the forward opening and the reverse opening.

17. The apparatus of claim 13, wherein:

the tractor body has a leading end coupled to the magnetic tractor casing proximate to the second end of the magnetic tractor casing;

the tractor body has a following end located within the magnetic tractor casing proximate to the first end of the magnetic tractor casing; and the apparatus further comprises a cable head selectively connected to the tool string, the cable head being located at the following end of the tractor body.

18. The apparatus of claim 13, further comprising outer openings spaced along the magnetic tractor casing, each of the outer openings selectively directing fluids from within the central bore to outside the magnetic tractor casing, to maintain an annular space between the magnetic tractor casing and the borehole.

19. A method for maneuvering a tool string within a borehole of a subterranean well, the method comprising:

providing a tractor assembly, the tractor assembly comprising a magnetic tractor casing with a central bore, a tractor body located within the central bore, a plurality of magnets spaced along an outer surface of the tractor body, and a plurality of angled opening assemblies spaced along the tractor body;

attaching the tool string to a cable head of the tractor assembly;

lowering the tractor assembly and the tool string into the subterranean well;

operating the magnets to generate a second magnetic field to interact with a first magnetic field of the magnetic tractor casing to maintain an annular space between the tractor body and the magnetic tractor casing;

directing fluids through the angled opening assemblies and away from the tractor body, to maintain an annular space between the magnetic tractor casing and the borehole; and pumping fluids into the borehole to move the tractor assembly forwards and backwards within the borehole.

20. The method of claim 19, wherein the tractor assembly includes a plurality of fluid lines, each of the fluid lines providing a fluid flow path from an entrance end of the fluid line proximate to a first end of the magnetic tractor casing to an exit end at the angled opening assemblies, and wherein the step of directing fluids through the angled opening assemblies includes directing fluids through the fluid lines.

21. The method of claim 19, further comprising moving the tractor assembly forwards and backwards within the borehole by directing the fluids through the angled opening assemblies and away from the tractor body.

22. The method of claim 19, wherein each of the angled opening assemblies include tubular segments arranged in a diamond shaped pattern, each of the tubular segments having adjustable openings extending through a sidewall of the tubular segments, and wherein the method further comprises adjusting a size of the adjustable openings with a control system to control a flow of the fluids through the adjustable openings.

23. The method of claim 19, wherein the magnetic tractor casing has outer openings spaced along the magnetic tractor casing, the method further comprising directing fluids from within the central bore to outside the magnetic tractor casing through the outer openings to maintain an annular space between the magnetic tractor casing and the borehole.

* * * * *